Patented Jan. 1, 1946

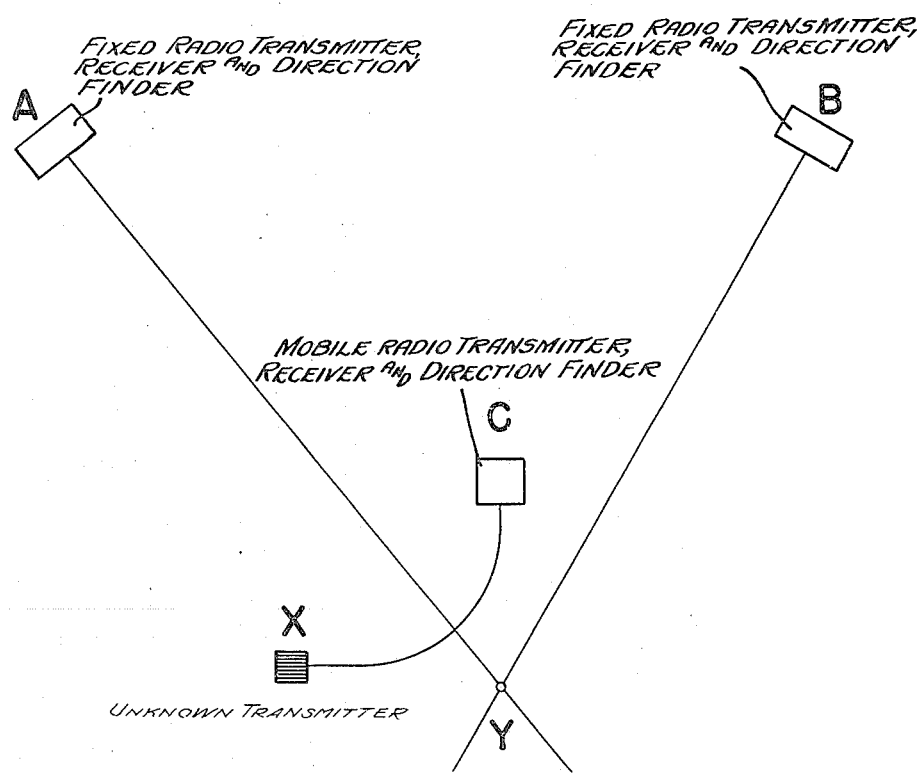

2,391,883

UNITED STATES PATENT OFFICE 2,391,883

DIRECTION FINDING PROCEDURE

Francis L. De Muth, Mitchel Field, N. Y.

Application November 5, 1943, Serial No. 509,101

4 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to direction finding, and more particularly to improvements in methods of locating radio transmitting apparatus.

Methods heretofore employed to locate radio transmitting apparatus have been inadequate in that they relied mainly upon the continual operation of the apparatus being located. When the apparatus ceased transmitting radio signals there were no longer means to indicate the existence of the apparatus. This presented a serious handicap as all that was necessary in some instances to prevent discovery was to cease transmitting signals.

It is therefore an object of this invention to provide a method for locating radio transmitting apparatus without requiring the apparatus to continue in operation.

A further object is the provision of a method of locating radio transmitting apparatus rapidly, without requiring assistance from the apparatus being located. A further object of this invention is to obtain the position of a radio station by direction finding methods more accurately than has been possible. There and other objects, are attained by the steps and procedure hereinafter described and illustrated in accompanying drawing, forming a part hereof, in which the single figure is a diagram indicating the steps employed in the method.

In accordance with the invention, signals transmitted by radio apparatus located at an unknown point X, are received by two direction finders A and B, spaced apart and located at definite points. The installation at each radio direction finding station A and B may also include radio transmitters and receivers for communication purposes hereinafter described. The intersection Y of lines from the direction finders indicates the apparent position of the unknown transmitter. A vehicle C equipped with a radio transmitter and receiver as well as radio direction finding apparatus then proceeds to the apparent position Y of the unknown transmitter. However, due to deflection of the radio signals the actual position of the unknown transmitter will be at a point X. If the unknown radio transmitter continues to transmit signals, the vehicle can quickly proceed to the actual point X by sense obtained from use of its own direction finders. However, if the unknown transmitter discontinues transmitting signals, the mobile radio transmitter in the vehicle is moved to various points and sends out signals to the two direction finders A and B at fixed locations until signals received by the direction finders are identical in directional indications with signals originally received from the unknown transmitter. When this occurs the vehicle will be at the actual point X.

From the above description it will be seen that there has been provided a simple and effective method for locating the position of an unknown radio transmitter. After the existence of the unknown transmitter has been ascertained as a result of receiving signals therefrom and the direction finders have determined the apparent position of the unknown transmitter, further operation of the unknown transmitter is not necessary to determine the exact position of the unknown transmitter.

This method is particularly valuable in peacetime for locating illegally operated radio stations, or, in war, enemy radio stations, since the vehicle under those circumstances must be protected by heavy armor which makes its own direction finder somewhat inaccurate. This inaccuracy coupled with other possible inaccuracies resulting from radio waves passing through regions of different character, render the vehicle itself unsuitable for locating the exact position of the unknown station.

The operators at direction finders A and B must communicate with the vehicle and direct him toward the unknown station. To accomplish this, the two operators at A and B may communicate individually or the two may coordinate their data with a third person who observes the position of the vehicle on a map and directs him by radio toward the unknown station.

I claim:

1. The method of locating a radio transmitter, comprising receiving with direction finders positioned at two different fixed points radio signals from the transmitter to indicate the apparent position of the transmitter, sending a mobile transmitter toward the apparent position and moving the mobile transmitter to various positions and from time to time transmitting signals back to the direction finders until a signal has been received by the direction finders from the mobile transmitter positionally identical with the signals received from the transmitter to be located.

2. The method of locating the position of an unknown radio transmitter which includes receiving waves from the unknown station with two direction finders located at two different fixed points and thereby determining the apparent position of the station, sending a vehicle toward the apparent position of the unknown radio transmitter, transmitting radio signals from said vehicle, communicating information from the direction finders to the vehicle and thereby directing the course of the vehicle until its bearings as determined by said direction finders agrees with the bearings obtained for the unknown station.

3. In a method of locating the position of an unknown radio transmitter, the steps comprising receiving signals from the unknown transmitter at two different fixed points, locating the apparent geographical position of said unknown radio transmitter from said signals, sending a mobile radio transmitter toward said apparent geographical position, transmitting radio signals at intervals from said mobile radio transmitter and moving said mobile transmitter until the position of said mobile transmitter as ascertained from its signals received at said two different fixed points coincides with the apparent geographical position of said unknown station.

4. A method of locating the position of an unknown radio transmitter, the steps comprising receiving signals from the unknown transmitter at a plurality of separated points, locating the apparent geographical position of said unknown radio transmitter from said signals, moving a mobile radio transmitter toward said apparent geographical position, transmitting radio signals at intervals from said mobile radio transmitter until its geographical position as ascertained from its radio signals received at said plurality of separated points coincides with the apparent geographical position of the unknown radio transmitter.

FRANCIS L. DE MUTH.